Jan. 18, 1966  G. M. E. VAN DEN BROEK ETAL  3,230,528
MOVING TARGETS ELECTROMAGNETIC DETECTION SYSTEMS
Filed Aug. 31, 1959  4 Sheets-Sheet 1

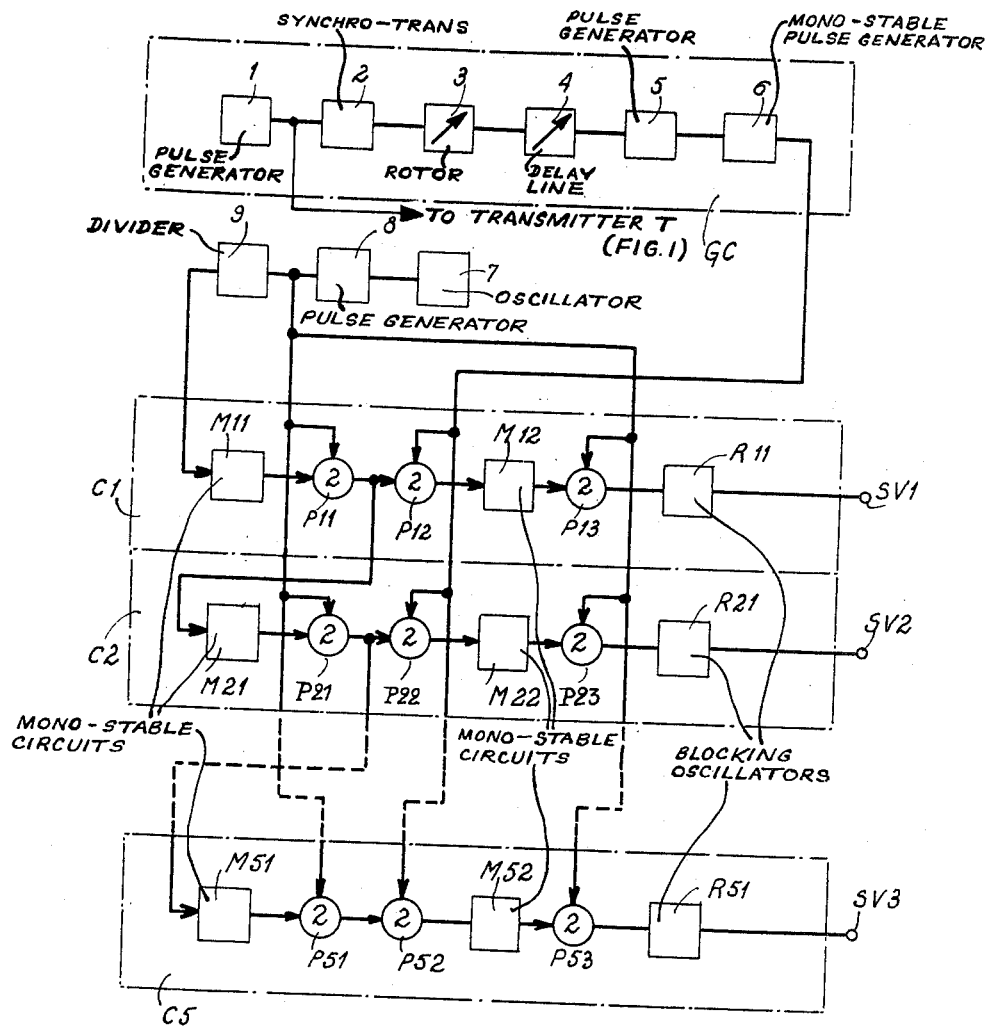
Fig:2

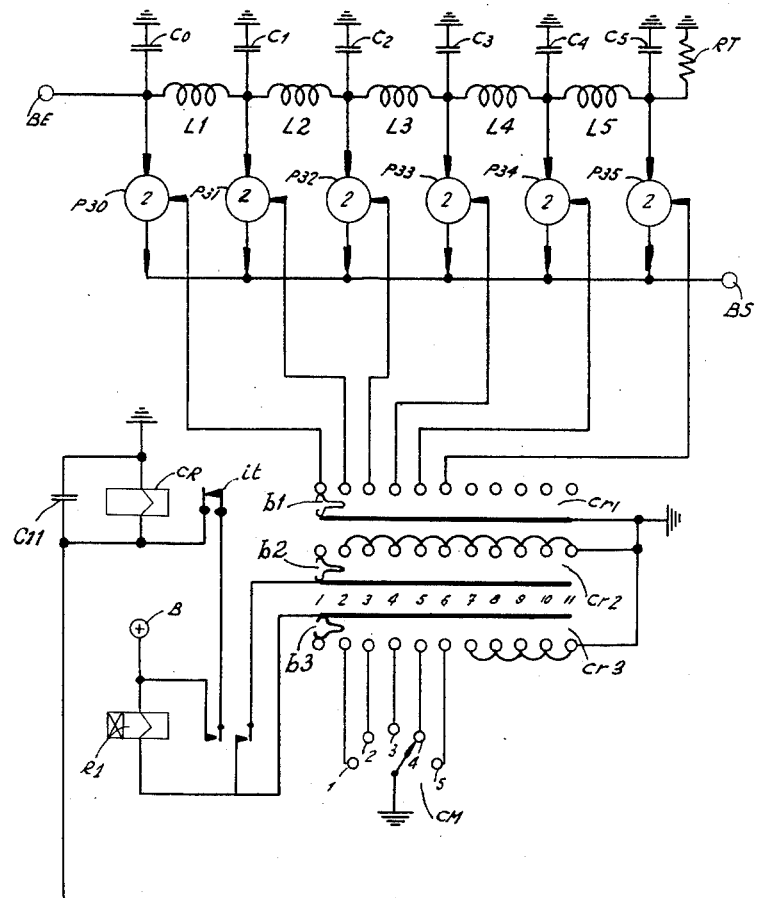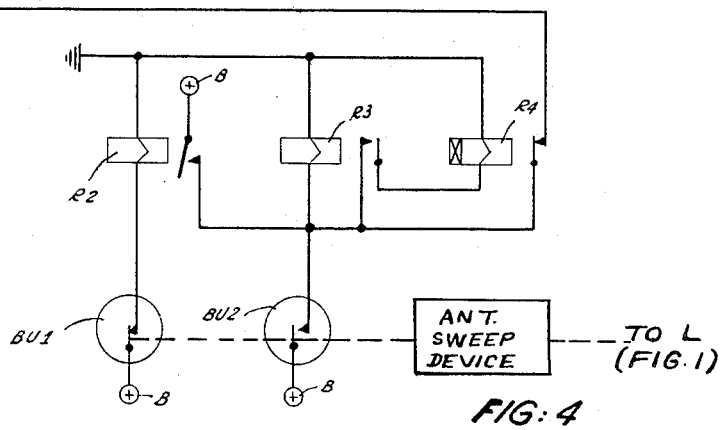
FIG. 4

United States Patent Office 3,230,528
Patented Jan. 18, 1966

3,230,528
MOVING TARGETS ELECTROMAGNETIC DETECTION SYSTEMS
Gérard Marie Edouard van den Broek, Versailles, Seine-et-Oise, and Henri Yves Bouver, Paris, France, assignors to Laboratoire Central de Telecommunications, Paris, France, a corporation of France
Filed Aug. 31, 1959, Ser. No. 837,281
6 Claims. (Cl. 343—11)

In the patent application Serial No. 837,284 filed August 31, 1959, a detection system by electromagnetic waves was discribed, operating by pulses, which apply especially to the detection of moving targets in the presence of stationary targets. It is well known that such systems take advantage of the variations from one repetition period to the next, of the phase difference between the wave emitted and the wave received after reflection from a moving target (Doppler effect) in order to select these echos and to differentiate them from those received after reflection on a stationary target. Such a detection system by electromagnetic waves will be called "Doppler Radar" in the course of the description.

On the other hand, in the proposed system, the signals obtained at the output of a "Radar Doppler" of known type, are sampled in time and distributed successively onto a given number ($n$ for example) of reception channels each one including means for extracting the signals corresponding to the echos received after reflection on the moving targets. This sampling has been made at a repetition frequency $n$ ($F+f_1$) where F is the frequency of emitted pulses and $f_1$ a small number with respect to F. Thus, during an interval of time equal to $$\frac{F+f_1}{f_1}$$

periods of repetition of the control pulses, a given channel receives all of the signals received after reflection on the target located inside the scan limits of the radar. To simplify the explanation, let us assume here that the antenna is fixed and that the repetition frequency has been selected in such a manner that all the echos corresponding to the target located inside of the scan limits of the radar are received between two successive emission impulses. It is understood that in these conditions all of the echos received after reflection on the targets located inside of the scan limits are sampled and distributed onto an ensemble of $n$ reception channels during an interval of the time equal to $$\frac{F+f_1}{nf_1}$$

periods of repetition of the control pulses. However, as each reception channel includes a low-pass filter whose cut-off frequency is appreciably lower than the frequency of repetition of the emitted pulses, information on the distance at which a moving target is found, which means the interval of time between the pulse emitted by the antenna and the pulse received as an echo after reflection on a moving target, is lost.

In order to restore this information, the output signals of the $n$ reception channels are sampled in synchronisation with the input sampling. The signals obtained after this sampling are mixed and applied to the indicator apparatus.

A detailed description of such a system is given in the above mentioned patent application Serial No. 837,284 and also in the patent application Serial No. 837,283, filed on August 31, 1959, under the title "Moving Target Electromagnetic Detection Systems."

In the two above mentioned patent applications one has, in order to simplify, considered the case of a fixed antenna and the signals received after reflection on the moving targets appearing on the screen of an oscilloscope by means of a display called type A. It is understood, however, that one can utilize a type B display of conventional type by restricting the horizontal sweep of the cathode ray tube to the movement of the antenna and the vertical sweep to the repetition frequency, the signals obtained after the mixing at the output of $n$ reception channels being then utilized to control the luminosity of the spot on the screen.

In such a system of separation of echos received after reflection from moving targets, the speed of information obtainable by the system is utilized at the maximum only when one desires to observe the whole depth of the zone within the scan limit of the radar. However, it is often necessary to observe a small fraction of the total zone. In this case, the system described in the two aforementioned patent applications does not best utilize the information speed of the detection system.

One of the objects of the invention is to provide means for utilizing to the maximum the information speed of the detection system of moving targets when one wishes to observe only a fraction of the total scan zone of the radar.

The invention will be particularly described with reference to the accompanying drawings in which:

FIGURE 2 shows the generator circuit of sampled signals involving characteristics of this invention.

FIGURE 4 shows an example of a switching circuit utilized to control the depth of the zone explored by the detection system of moving targets.

Figure 1:
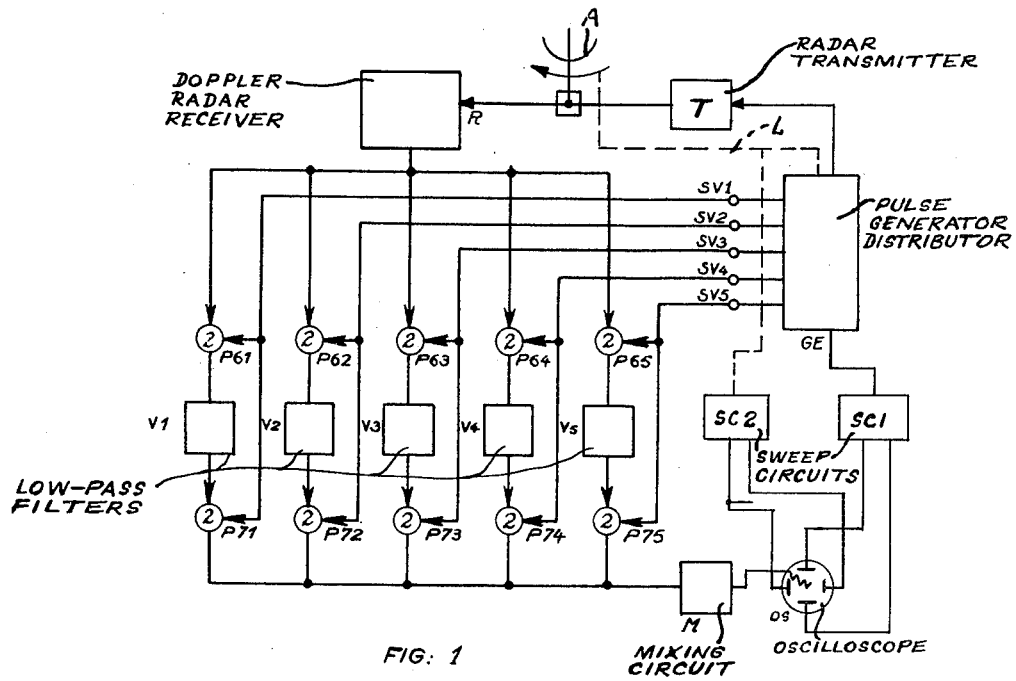
FIGURE 1 shows schematically the detection system of moving targets.

In FIGURES 1, 2 and 4 of the accompanying drawings, an electronic gate is represented in conventional manner by a circle associated to radial conductors. The input or control conductors have an arrow whose point touches the circle. The number inside of the circle indicates the number of control signals which should be applied to the electronic gate in order to obtain a signal on the output conductor.

FIGURE 1 represents schematically the circuit for the utilization of the output signals of a "Radar Doppler," such as is described in detail in the aforementioned patent applications. Reviewing briefly the operation: A transmitter is shown at T from which pulses of a given repetition rate are transmitted over antenna A. The antenna is oscillated, and by a linkage L is coupled with a pulse generator GE for a purpose to be described later. Also, a line is shown coupled from GE to T to synchronize the pulse transmission.

The "Radar Doppler" R (FIGURE 1) furnishes, at its output, two types of signals: pulses whose amplitude remains constant from one period to the next and which correspond to the echos received after reflection on stationary targets, and pulses whose amplitude is sinusoidally modulated at the Doppler frequency and consequently, varies from one repetition period to the next, such signals corresponding to the echos received after reflection from moving targets. These output signals are sampled and distributed to five receiving channels V1, V2, V3, V4 and V5 by means of five electronic gates P61, P62, P63, P64, and P65, respectively.

The control pulses for these electronic gates are furnished by the generator GE which distributes successively to the control terminals SV1, SV2, SV3, SV4, SV5 pulses obtained from pulse generator whose repetition frequency is $5 (F+f_1)$, F being the repetition frequency of pulses emitted by radar R and $f_1$ being a number expressing a frequency small with respect to F.

The frequency of the control pulses of an electronic gate corresponding to a given channel is then $F+f_1$.

As has been explained in the aforementioned patent application $f_1$ determines the exploration speed in the time of the signals received by the radar antenna.

Each reception channel such as $V_1$ is provided in order to separate the signals corresponding to moving targets from those corresponding to stationary targets. To this effect, it comprises especially low-pass filters whose cut-off frequencies are appreciably lower than the repetition frequency of pulses emitted by the antenna, so that several periods of repetition of emitted pulses are necessary to separate the signals corresponding to moving targets from those corresponding to stationary targets. In such conditions, information concerning the distance which is constituted by the time interval elapsing between the pulse emitted by the antenna and the pulse received, is lost in the reception channel. In order to restore this information, the output signals of receiver channels $V_1$ to $V_5$ are sampled respectively by means of electronic gates $P_{71}$, $P_{75}$. This is performed in synchronisation with the input sampling or, in other terms, these electronic gates are controlled by the same control pulses as the electronic gates $P_{61}$ to $P_{65}$.

The output signals of the electronic gates $P_{71}$ to $P_{75}$ are then mixed or interleaved by means of circuit M where they are applied to a brightness control electrode of display device OS comprising an oscilloscope. The sweep circuits of the oscilloscope shown at SC1 and SC2 are controlled by pulses from GE and the antenna linkage L. The use of these sweep circuits will appear later in a detailed description of the invention.

In the above mentioned patent applications, as an example, the case of a radar whose antenna is directed in a fixed direction using a type A display in which the horizontal sweep is made in synchronism with the pulses emitted by the antenna, the output pulses of five channels being then applied to the vertical deviation electrodes is described.

However, it should be well understood that, when the antenna sweeps a determined angle, it is possible to utilize a conventional type B display in which, for example, the vertical sweep is made in synchronism with the repetition frequency of the emitted pulses, whereas the horizontal sweep is in synchronism with the movement of the antenna. Such sweep circuits are shown a SC1 and SC2. In this case, the output signals of the five channels are utilized after having been mixed or interleaved in the circuit M to control the luminosity of the spot on the screen.

Referring now to FIGURE 2 which represents an impulse generator according to the invention and which can be substituted for the signal generator GE of FIGURE 1, so as to get the best profit from the information speed of the system for the separation of moving targets. Represented in GC in FIGURE 2 is pulse generator which produces pulses $I_6$ (FIGURE 3) with the same repetition frequency as the pulses emitted by the antenna, said pulses being delayed by a predetermined time interval with respect to the pulses omitted by the antenna, and having a predetermined duration proportional to the depth of an elementary zone explored by the radar within the total zone scanned by the radar. In the example shown, it will be assumed that the minimum elementary zones that can be explored are of five kilometers, so that pulses $I_6$ have a duration of 33 microseconds.

The pulse generator GE comprises a generator 1 which furnishes the impulses IE (FIGURE 3) in synchronism with the pulses emitted by the antenna. These pulses control a three phase generator 2, the phases of which are applied to the stator of synchrotransmitter 3, having a single phase rotor which delivers at its terminals a monophased sinusoidal voltage the phase of which depends linearly on the rotation angle of the rotor and can consequently be adjusted in a continuous manner. This voltage is applied to a delay line 4 comprising several sections, which is associated to means for choosing the number of utilized sections. Each section of the delay line 4 introduces a delay equal to the duration of the pulse $I_6$, i.e., 33 microseconds in the considered example. The delayed sinusoidal voltage is used to synchronize pulse generator 5 which furnishes short pulses of the frequency of emitted pulses delayed by an interval of time adjustable with respect to the emitted pulses.

In the circuit of FIGURE 2 two delay circuits have been utilized, one introducing a delay which, can be adjusted in a continuous fashion and which as will be shown further on, permits the operator to choose the origin of the zone explored by the radar, and the second which makes it possible to vary the delay by discrete steps and which will be utilized to automatically control the exploration of a given number of successive elementary zones which can be chosen by the operator.

The output pulses of circuit 5 are then applied to a pulse generator 6 of a monostable type which furnishes pulses $I_6$ of a predetermined duration namely 33 microseconds.

Figure 3:
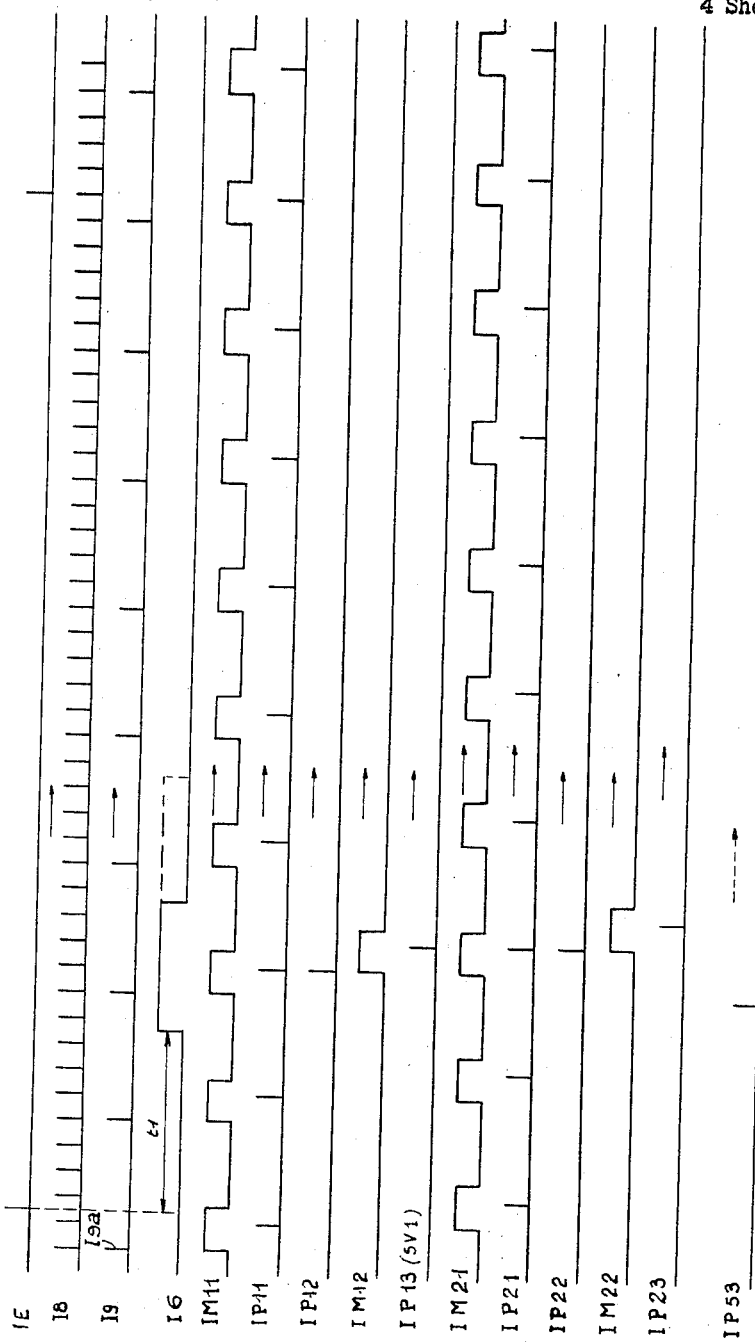
FIGURE 3 shows diagrams of pulses utilized to explain the operation of the circuit of FIGURE 2.

The circuit 7 is an oscillator which furnishes a sinusoidal wave of frequency $Kn (F+f_1)$, F being the repetition frequency of the pulses emitted by the antenna and $f_1$ a frequency small with respect to F, K being the number of elementary zones within the total scan zone of the radar and $n$ the number of reception channels. In the particular case considered, $K=8$ and $n=5$. The output oscillations of the circuit 7 are utilized to synchronise a pulse generator 8 which furnishes the pulses $I_8$ (FIGURE 3). These pulses $I_8$ are then applied to a circuit 9 which divides the pulse frequency $I_8$ by 5 (i.e., by the number of reception channels) and furnished the pulses $I_9$ (FIGURE 3). The output pulses of the circuits 6, 8 and 9 are utilized to produce, by means of circuits C1 to C5, the control pulses of electronic gates P61 to P65 (FIGURE 1). On FIGURE 2 only the circuits C1, C2 and C5 have been represented.

Consider first the circuit C1 which furnishes the sampling control pulse for channel V1 (FIGURE 1). The pulses $I_9$ are applied to the monostable circuit M11 which furnishes, for each input pulse, a pulse IM11 of a duration of 10 microseconds, i.e., a duration slightly superior to the time interval separating two successive pulses $I_8$.

Pulses IM11 and pulses $I_8$ are applied respectively to the two inputs of the electronic gate P11 in coincidence, which furnishes at its output the pulses IP11 (FIGURE 3) which are thus delayed in respect to impulses $I_9$ by a repetition period of pulses $I_8$. Pulses IP11 and pulses $I_6$ are applied to the electronic gate P12 in coincidence (FIGURE 2) which furnishes at its output a pulse IP12 by having a repetition period of the pulses emitted by the antenna. Pulses IP12 control the monostable circuit M12 which gives, in response to each input pulse a pulse of a 10 microsecond duration which is applied to gate P13, in coincidence with pulses $I_8$. The output pulses of IP13 of electronic gate P13 are thus delayed in respect to pulses $I_9$ two repetition periods of pulses $I_8$. Pulses IP13 are utilized to control the generator R11 which, in the case considered, is a blocking oscillator which furnishes to the output terminal SV1, the sampling control pulse of the reception channel V1 (FIGURE 1).

Circuits C2 to C5 each include the same elementary circuits as the circuit C1; however, each circuit C2 to C5 is controlled by the output pulse of the first electronic gate in coincidence with the preceding channel. For example, the monostable circuit M21, identical to circuit M11, is controlled by pulses IP11 which are delayed by a repetition period of pulses $I_8$ in respect to pulses $I_9$ which control the circuit M11.

It is understood that in these conditions the output pulse of the circuit C2, which appears at the terminal SV2, is delayed with respect to the output pulse of circuit C1 by a repetition period of pulses $I_8$.

One can follow by means of the diagrams of pulses IM21, IP21, IP22, IM22, IP23, IP53, on FIGURE 3, the operation of circuits C2 to C5 which are identical to circuit C1.

The pulses obtained at the terminals SV1 to SV5, FIGURE 2, are then applied to the terminals SV1 to SV5, FIGURE 1 to control the sampling of the reception channels.

In relation to FIGURE 2, only the case of the exploration of an elementary zone of a depth of 5 kilometers has been considered. When one wishes to explore several successive zones, one puts in operation the circuit of FIGURE 4 which is associated to the delay circuit 4, FIGURE 2. In a general manner, this circuit operates in the following way: Let us assume that one wishes to explore a zone constituted by three successive elementary zones and whose origin is determined by means of circuit 3, FIGURE 2. At the time of the exploration of the first elementary zone, circuit 4, FIGURE 2, introduced no delay and, at the end of the sweeping by the antenna, the circuit of FIGURE 4 is controlled so as to introduce a delay of 33 microseconds by the circuit 4. In the course of this sweep of the antenna, only the signals corresponding to the second zone are sampled. At the end of this sweep, the circuit of FIGURE 4 introduces, by circuit 4, FIGURE 2, of a delay of 66 microseconds, so that, during the following sweep, only the signals corresponding to the targets located in the third elementary zone will be sampled. At the end of third sweep, the circuit of FIGURE 4 automatically goes into rest position so that circuit 4, FIGURE 2, introduces no more delay and the signals sampled in the course of the following sweep correspond again to the first elementary zone.

We will now show the operation of the circuit represented on FIGURE 4 which shows in detail the delay circuit 4, FIGURE 2. The output signals of circuit 3, FIGURE 2, are applied to the terminal BE, FIGURE 4 and the output signals of the circuit represented on FIGURE 4, which appear at the terminal BS, are applied to the input of circuit 5, FIGURE 2. One sees in FIGURE 4 the delay line constituted by five identical sections $L_1$–$C_1$, $L_2$–$C_2$, $L_3$–$C_3$, $L_4$–$C_4$, $L_5$–$C_5$, said delay line being closed on its characteristic impedance represented by resistance RT. The five sections of the delay line are identical, each section introducing a delay of 33 microseconds as has been explained above. The extremities of the delay line and the intermediate points are respectively connected to the electronic gates $P_{30}$, $P_{35}$ and $P_{31}$ to $P_{34}$. The outputs of these electronic gates are all connected to the output terminal BS. The control signals of the electronic gates are applied beginning from the circuit represented on the lower part of FIGURE 4, which makes it possible to choose the number of sections of the delay line which are introduced between circuit 3, FIGURE 2 and circuit 5, FIGURE 2. One assumes that the electronic gates $P_{30}$ to $P_{35}$, which can be of a conventional type, are normally blocked and that they present a low impedance to the output signals of the delay line only when one connects the associated control conductor to ground. The control circuit of the electronic gates is constituted by a counter having as many counting positions as there are electronic gates $P_{30}$–$P_{35}$, i.e., six in the example considered, said counter being associated to means for causing its return to the rest position when it reaches a predetermined position which can be chosen selectively. The stepping of the counter is produced at the end of travel of the antenna by the limit-switch contacts associated to the abutments, represented on the lower part of FIGURE 2 in $BU_1$ and $BU_2$. One assumes that the contact $BU_1$ is normally closed, this contact being open during a fraction of a second when the antenna arrives at the extreme left of its course, whereas, the contact $BU_2$ is normally open and it is closed during a fraction of a second when the antenna arrives at the extreme right of its course. The counter is represented, in the embodiment considered, by a step-by-step switch, of a type well known in automatic telephony and has 11 positions, only six of these positions being in fact utilized. Such switches are well known in the art and are herein represented by conventional diagram. The electro-magnet of the step-by-step switch is represented at CR. Represented in $C_{11}$ is the capacitor connected in parallel to the terminals of the winding, this capacitor playing the role of a spark quencher and in it the interrupter controlled by the winding which is utilized for the automatic return into rest position. The switch has three banks of terminals $cr_1$, $cr_2$, $cr_3$ associated to the brushes $b_1$, $b_2$, $b_3$. Four relays $R_1$, $R_2$, $R_3$, $R_4$ are associated to the step by step switch to control its operation. One will assume, to explain the operation of the circuit, that the step by step switch is in position 1, which means in rest position and that the antenna has begun its movement from the left toward the right. One also assumes that one wishes to explore successively four elementary zones and that consequently the manual commutator switch CM has been placed at position 4, connecting a ground to the terminal 5 of bank $cr_3$. In this case, during the movement of the antenna a ground is connected by the brush $b_1$ to the control conductor of gate $P_{30}$, so that the input signals applied to the input terminal BE are applied without delay to the output terminal BS. When the antenna arrives at the end of the course and meets the right abutment, the contact $BU_2$ is closed, causing the operation of relay $R_3$. Closing contact $BU_2$ also completes the operating circuit for the step-by-step switch by energizing its electro-magnet CR over a circuit positive battery B, contact $BU_2$, back contact of $R_4$ winding of rely CR to ground. Operation of relay $R_3$ completes an operating circuit for relay $R_4$, as shown conventionally as a slow operating relay, over an obvious circuit from $BU_2$. Relay $R_4$ upon operation opens its back contacts breaking the circuit of electro-magnet CR which then releases causing the switch to step to position 2.

The arrangement of the two relays $R_3$ and $R_4$ limits the duration of the control pulse applied to the step by step switch magnet CR and renders it independent of the duration of the closing of contact $BU_2$. It is understood that it is possible to increase the duration of this pulse by utilizing for relays $R_3$ and $R_4$, relays which operate at more or less rapid speeds, which is possible to obtain by means well known in the teachnique. The antenna then effects a sweep from the right toward the left and during the entire sweeping the electronic gate $P_{31}$ is open resulting from the fact that a ground is applied to its control conductor through brush $b_1$ in position 2. The signals applied to the terminal BE then go through the first section of the delay line and appear at the output terminal BS with a delay of 33 microseconds. As soon as the antenna begins its movement from the right toward the left, the contact $BU_2$ is open and the relays $R_3$ and $R_4$ return to a rest position. When the antenna terminates its course from the right to the left, it opens the contact $BU_1$ causing the release of the relay $R_2$ closing its break contact. The break contact of relay $R_2$ plays the same role in operating relays $R_3$ and $R_4$ as did the closure of contact $BU_2$. It thus causes the application of an advancement pulse of a predetermined duration to the magnet of step-by-step switch CR which passes into position 3 as soon as the relay $R_4$ operates. When the antenna begins its sweep from the left toward the right, the contact $BU_1$ is again closed: relay $R_2$ operates and causes the return to rest position of relays $R_3$ and $R_4$.

During this movement of the antenna from the left toward the right, the electronic gate $P_{32}$ is open, a ground being applied by the brush $b_1$ in position 3 to the associated control conductor and the input signals are applied to the output terminal BS with a delay of 66 microseconds.

The operation continues, the switch passing into position 4 when the antenna causes the closing of contact $BU_2$ at the end of its course from the left toward the right and the passage of the commutator into position 5 when the antenna causes the opening of contact $BU_1$ at the end of the following sweep from the right toward the left.

When the step by step switch reaches position 5, the relay $R_1$ operates by means of the following circuit: battery, relay winding $R_1$, brush $b_3$ of bank $cr_3$ in position 5, manual commutator CM in position 4, ground. By the closure of its outer make contact, the relay $R_1$ closes the following holding circuit, battery, relay winding $R_1$, outer make contact of relay $R_1$, brush $b_2$ in position 5, terminal 5 of bank $cr_2$, ground. Relay $R_1$ will thus remain operated as long as the step by step switch does not return to position 1. The step-by-step switch then operates by means of the following circuit: ground, operating winding of step-by-step switch electro-magnet CR, interrupter $it$ of the step-by-step switch, inner make contact of relay $R_1$, battery. Upon operation it opens interrupter contacts $it$ releasing magnet CR and causing the switch to step. Release of CR permits contacts $it$ to again close repeating the stepping operation. It then operates in auto-rotation until it arrives at position 1 at which the holding circuit of relay $R_1$ is opened. This relay falls back and opens the operating circuit of the step-by-step switch which is then put back into initial condition. The rotation speed of the antenna is relatively slow, so that the switching operations, included therein the return to the rest position of the step-by-step switch CR, can take place while the antenna is going in the reverse direction without injuring the operation of the apparatus. In the example under consideration, an electro-mechanic switch has been used, but it must be understood that an electronic switch could have been used involving, for example, vacuum tubes or gas tubes to obtain the desired result.

It appears clearly that by means of the manual counter CM, FIGURE 4, it is possible to select the number of successive elementary zones which are explored by the radar.

Figure 5:
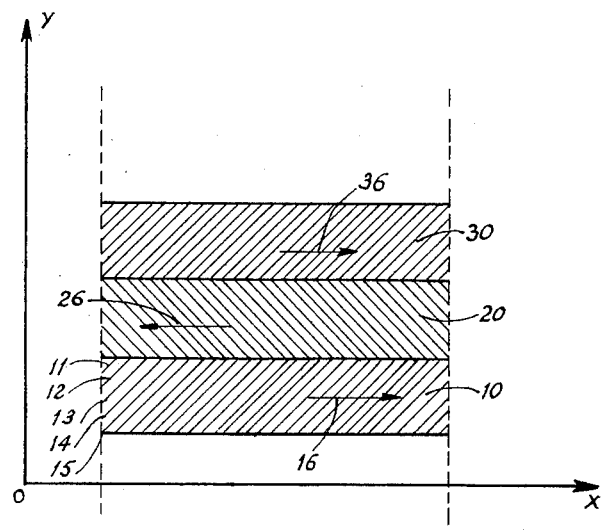
FIGURE 5 shows schematically the aspect of the oscilloscope screen in the case of the exploration of three successive zones.

Represented in FIGURE 5, in schematic form, is the image as it appears on an oscilloscope OS in the case of exploration of three successive elementary zones. The horizontal sweep in the OX direction is synchronised by the sweep of the antenna, whereas the vertical sweep is synchronised by the pulses emitted by the antenna. It follows that with this type of panoramic representation the distances are represented in OY and the angles in OX.

Three successive elementary zones are seen in 10, 20, 30. Represented in 11, 12, 13, 14, 15 are the portions of the radar picture which are explored respectively by means of the five reception channels. Arrows 16, 26 and 36 indicate respectively the directions in which the three zones 10, 20 and 30 are explored by the antenna.

While the principles of the above invention have been described in connection with specific embodiments and particular modifications thereof it is to be clearly understood that this description is made by way of example and not as a limitation of the scope of the invention.

What we claim is:

1. A radar system having a given range, a directive antenna, means for transmitting pulses at a repetition rate commensurate with said range, and means for sweeping said antenna over a given exploring angle divided into given angular zones, and an indicator having sweep circuits operating in synchronism with said range and angular sweeps respectively, an arrangement for limiting the indication response of said radar to targets in selected successive range zones which together constitute said given range, comprising means in the indicator control circuit for providing a complete sweeping of the angular sweep circuit through said exploring angle during the period said response is limited to a selected zone, and means responsive to completion of the exploring angle sweep for changing the response of said radar to the next successive range zone.

2. A radar system according to claim 1, further comprising manually adjustable means for limiting the response of said radar to a predetermined selected number of said range zones.

3. A radar system according to claim 1, wherein said means for limiting said response comprises a gating system including, electric gates, means for producing selecting pulses having the same repetition rate as said transmited pulses and a time duration commensurate with the extent of said range zones, means for adjusting the timing of said selecting pulses, and means for applying said selecting pulses to said electric gates.

4. A radar system according to claim 3, further comprising a source of gating pulses, means for selecting gating pulses from said source, and means to apply said selected gating pulses to said electric gates simultaneously with application of said selecting pulses.

5. A radar system according to claim 4, wherein said radar comprises a plurality of separate channels, and said source of gating pulses comprises means for providing a pulse train having a repetition rate of $Kn(F+f)$ in which K is the number of zones, F is the repetition rate of the transmited pulses, $f$ is a frequency small with respect to F, and $n$ is the number of channels, means responsive to pulses from said source to generate pulses having a duration greater than the spacing of the pulses of said train but less than the spacing of three of said train pulses and a repetition rate of said train divided by $n$, and means for selecting pulses from said train in response to said generated pulses.

6. A radar system according to claim 3, wherein said means for adjusting said timing comprises means for producing a sinusoidal wave synchronized with said transmitted pulses, means for shifting the phase of said wave in a continuous manner to select the origination timing of said selecting pulses, means for selectively changing the time delay of said phase shifted wave in discrete steps commensurate wtih said zones, and means for producing said selecting pulses from said delayed phase-shifted wave.

References Cited by the Examiner

UNITED STATES PATENTS 2,610,320  9/1952  Hall _____ 343—11
2,932,020  4/1960  Sproul _____ 343—11

CHESTER L. JUSTUS, *Primary Examiner.*

FREDERICK M. STRADER, KATHLEEN CLAFFY,
*Examiners.*